May 14, 1968    R. HAGER    3,382,531
APPARATUS FOR PRODUCING HOLLOW PLASTIC ARTICLES
Filed April 26, 1965    3 Sheets-Sheet 2
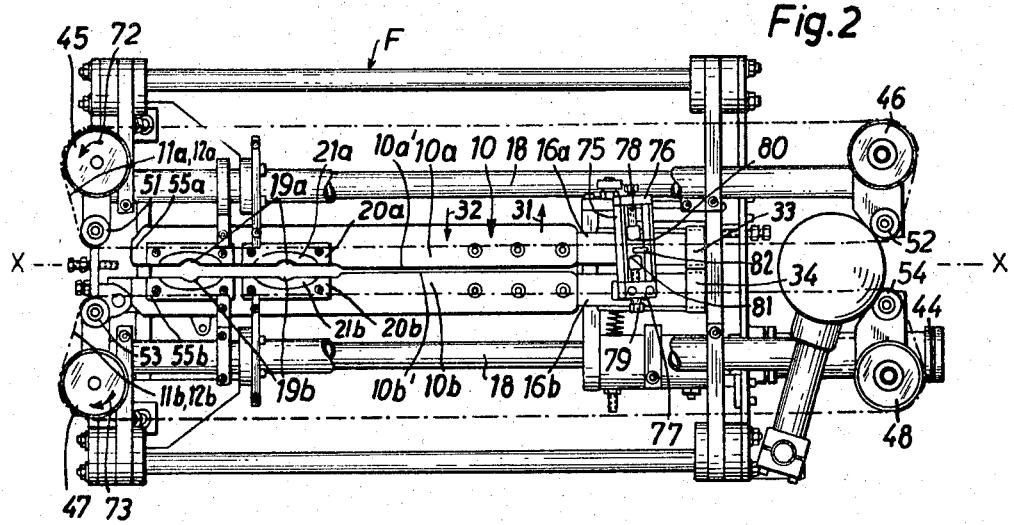
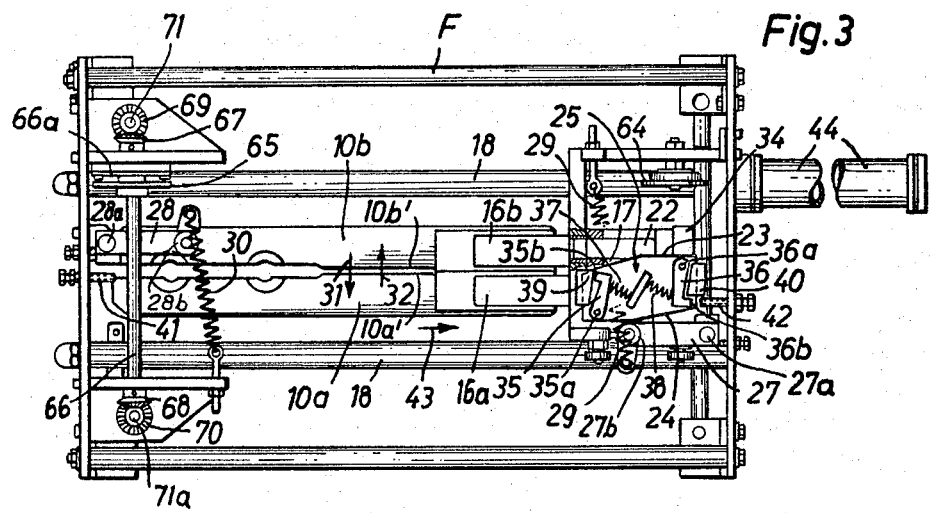
INVENTOR:
REINOLD HAGEN
BY
Michael J. Striker
his ATTORNEY May 14, 1968   R. HAGER   3,382,531
APPARATUS FOR PRODUCING HOLLOW PLASTIC ARTICLES
Filed April 26, 1965   3 Sheets-Sheet 3

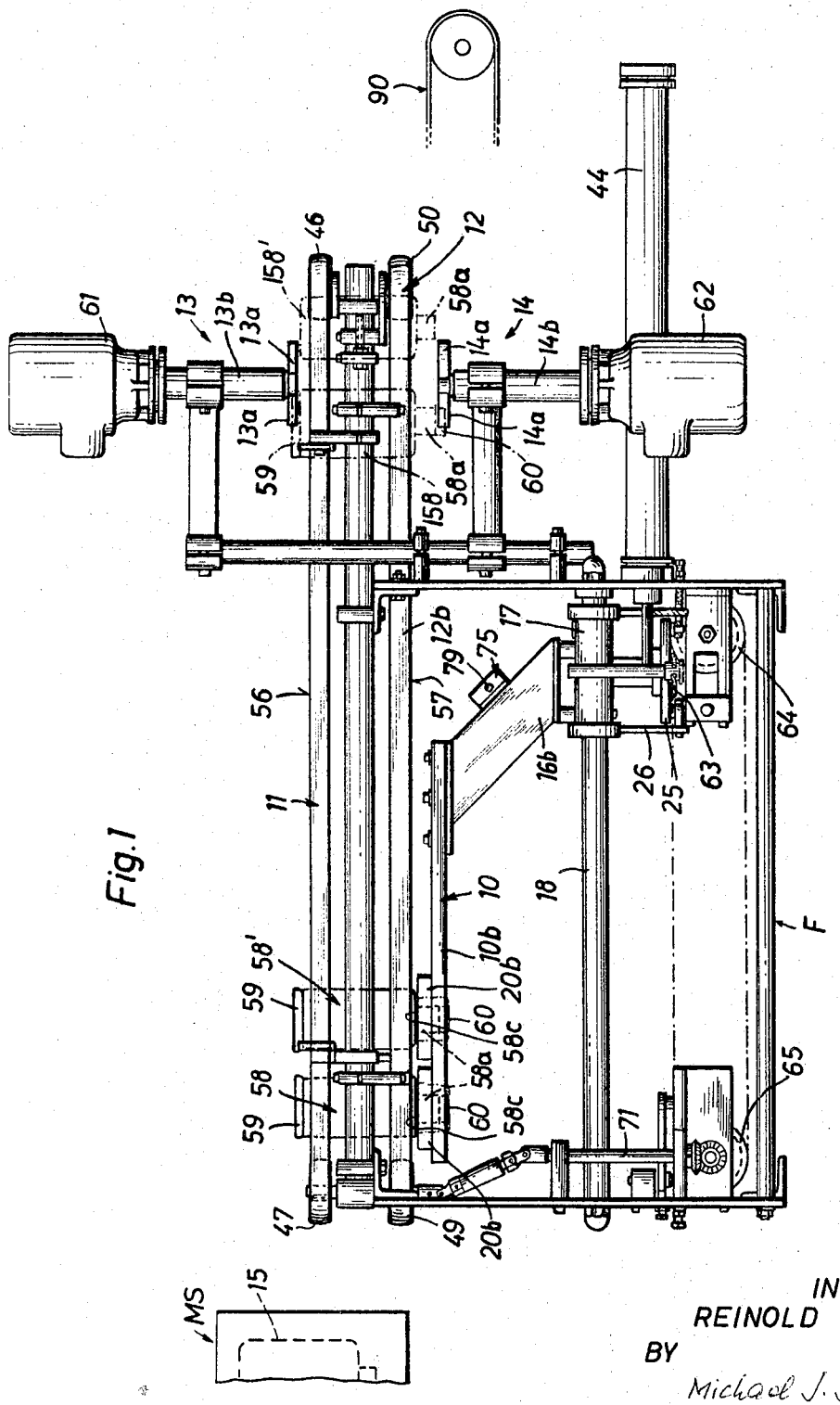

INVENTOR:
REINOLD HAGEN
BY
his ATTORNEY

United States Patent Office 3,382,531
Patented May 14, 1968

3,382,531
APPARATUS FOR PRODUCING HOLLOW
PLASTIC ARTICLES
Reinold Hagen, Hangelar uber Siegburg,
Rhineland, Germany
Filed Apr. 26, 1965, Ser. No. 450,754
Claims priority, application Germany, Apr. 25, 1964,
K 52,794
27 Claims. (Cl. 18—5)

ABSTRACT OF THE DISCLOSURE

An apparatus for molding and finishing plastic bottles or similar hollow plastic articles in which means for removing fins from the molded articles are arranged spaced from the mold and in which transfer or gripping means are provided for transferring the articles from the mold to the conveyor means which move the articles past the fin-removing means so that the fin may be removed from the molded articles in proper sequence and in an automatic manner.

---

The present invention relates to apparatus for the production of plastic bottles and similar hollow plastic articles. More particularly, the invention relates to an apparatus which preferably produces such plastic articles by the blow molding method and which is provided with means for removing fins, burrs, flashings or similar outwardly extending projections which develop when the articles are shaped in an open-and-shut mold. Still more particularly, the invention relates to improvements in devices and assemblies which transport hollow plastic articles from the region of the mold toward and past one or more fin removing devices.

It is well known to provide the sections or halves of an open-and-shut mold with cutting edges which will partially separate flashings or fins from the material accommodated in the mold cavity. Such flashings or fins constitute excess plastic material which is squeezed into the gaps between the mold sections or which extends beyond the ends of such sections. The cutting edges insure that the flashing or fins can be readily separated from the main part of a freshly shaped article because the connection between the flashing and the article consists of a very thin, and hence readily destructible or breakable web which will tear in response to flexing or shifting of the flashing with reference to the remainder of the article. Heretofore, such fins were removed mainly by hand which involves considerable expenses because each molding apparatus must be attended by at least one workman. The operation of modern blow molding apparatus is fully automatic so that such apparatus can produce hollow plastic articles without necessitating constant inspection. However, and when the flashings are removed by hand, each apparatus must be attended by at least one person to make sure that all of the flashings are removed before the articles reach the storing, filling, sterilizing, packing or other processing station.

It is already known to provide a blow molding apparatus with fin-removing or deburring devices which automatically remove fins or flashings while the articles travel in a predetermined path and are supported by the blowing mandrels which are used to admit compressed gas into a freshly extruded parison in the mold cavity. While such apparatus can remove flashings in a fully automatic way, they must be provided with a large number of blowing mandrels because the mandrels which support the articles during removal of flashings cannot be used for injection of gas into the mold cavity. One type of such apparatus is disclosed in my copending application Ser. No. 344,419 filed on Feb. 12, 1964 and now Patent No. 3,340,569.

Accordingly, it is an important object of the present invention to provide a novel apparatus for producing and processing plastic bottles and similar hollow plastic articles in such a way that the blowing mandrel or mandrels need not leave the molding station and that articles which are advanced past the fin removing station can be supported by means other than blowing mandrels.

Another object of the invention is to provide a blow molding apparatus wherein the operation of the mold need not be and is not affected by the provision of one or more fin removing devices which remove flashings, fins or similar outwardly extending projections at a rate corresponding to a maximum operation speed of the blow molding apparatus.

A further object of the invention is to provide a novel article gripping and transferring device which is constructed and assembled in such a way that it can automatically separate freshly shaped articles from the blowing mandrels at the time such mandrels perform a movement which they would have to perform regardless of the presence of automatic fin removing devices.

An additional object of the invention is to provide a novel conveyor which can receive two or more plastic articles at a time and which is capable of properly supporting and advancing such articles toward and past the fin removing station.

A concomitant object of the invention is to provide an apparatus of the above outlined characteristics wherein the shaping, removal, transfer and deburring of plastic bottles or similar hollow plastic articles will take place in a fully automatic way, at a speed corresponding to the speed of most advanced automatic molding apparatus, without any supervision, and with utmost accuracy so that the articles leaving the apparatus are immediately ready for storage, packing, filling, sterilizing or other treatment.

Still another object of the present invention is to provide an apparatus of the above outlined character wherein the articles may be separated from fins and similar projections regardless of whether the mold is arranged to shape only one or two or more articles at a time.

Briefly stated, one feature of my invention resides in the provision of an improved apparatus for the production and processing of plastic bottles and other hollow plastic articles of the type having readily separable outwardly extending fins or similar projections such as will develop when a bottle is produced in an open-and-shut mold, particularly by the blow molding method. In its elementary form, the improved apparatus comprises means including an open-and-shut mold which can shape one or more plastic bottles or similar hollow plastic articles at a time, one or more fin removing devices spaced from the mold, conveyor means for advancing the articles, preferably seriatim, past the fin removing devices and for supporting the articles in such position that the projections are automatically separated during travel past the fin removing devices, and means for transferring or feeding the articles from the region of the mold to the conveyor means. In accordance with a preferred embodiment of my invention, the means for transferring or feeding the articles to the conveyor means comprises a gripper having jaws which are movable toward and away from each other so as to grasp one or more articles at the molding station and to open when the articles are transferred to and are engaged and supported by the conveyor means. Such conveyor means may comprise one or more pairs of belts having stringers which are parallel to each other and define between themselves a passage in which the articles are advanced from the gripper toward and past the fin removing station.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawings, in which:

FIG. 1 is a somewhat diagrammatic side elevational view of a blow molding apparatus which embodies the gripper and the conveyor of my invention;

FIG. 2 is a top plan view of the structure shown in the central part of FIG. 1;

FIG. 3 is a bottom plan view of the structure shown in FIG. 2;

Figure 4:
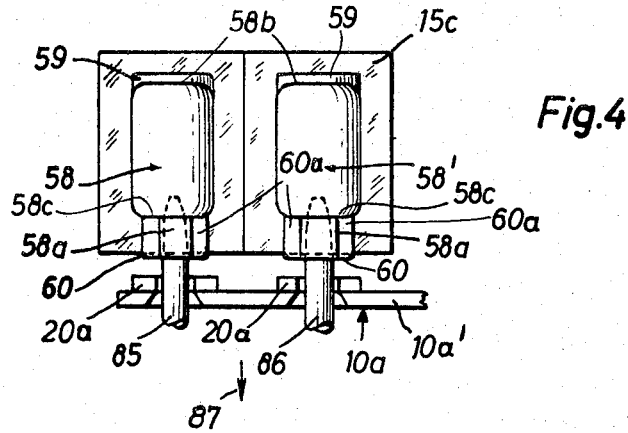
FIG. 4 is a front elevational view of one section of an open-and-shut mold which is utilized in the apparatus of FIG. 1.
Figure 5:
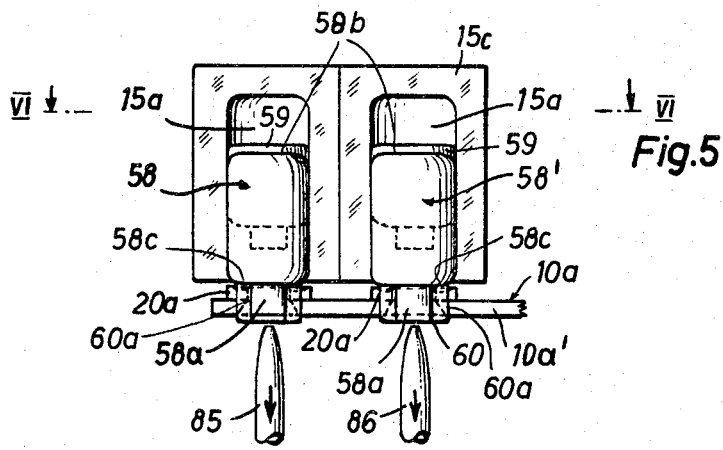
FIG. 5 illustrates the structure of FIG. 4 in a different position in which the freshly expanded and hardened plastic articles are supported by the gripper.
Figure 6:
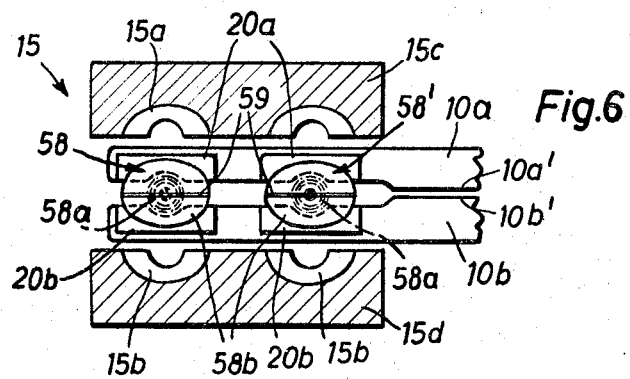
FIG. 6 is a horizontal section through the mold substantially as seen in the direction of arrows from the line VI—VI of FIG. 5.

Referring to the drawings, and first to FIGS. 1 to 3, there is shown a blow molding apparatus which comprises a molding station symbolically indicated in FIG. 1 by the reference character MS and accommodating a mold 15 of the open-and-shut type shown in FIGS. 4 to 6, a fin removing or deburring station accommodating two fin removing devices 13, 14, a transfer member or gripper 10 which receives pairs of simultaneously shaped plastic articles 58, 58' in the region of the mold 15 and advances such articles toward but short of the fin removing station, and a conveyor 11, 12 including two pairs of endless flexible belts serving as a means for receiving and supporting the articles 58, 58' from the gripper 10 and for advancing them past the fin removing devices 13, 14. Due to the fact that the pairs of articles 58, 58' are positively held or grasped during and subsequent to withdrawal from the cavities of the mold 15, the latter may be operated to shape a fresh pair of plastic articles while the articles 58, 58' advance toward and past the fin removing station.

In the illustrated embodiment, the articles 58, 58' constitute bottles or containers consisting of synthetic thermoplastic material, and the cavities of the mold 15 are configured in such a way that the neck portion 58a of each bottle is located at the lower end thereof, i.e., the bottles are inverted so that the fins 59 which are integral with their bottom wall portions 58b face upwardly (see particular FIGS. 4 and 5) and that the fins 60 extend downwardly beyond the neck portions 58a. Each fin 59 or 60 is connected to the adjoining portion of the bottle 58 or 58' by a thin web which can be readily destroyed by the fin removing devices 13, 14 when the bottles are caused to advance past the fin removing or deburring station. The devices 13, 14 are of the revolving blade type but their blades 13a, 14a need not cut into but merely strike against the fins 59 and 60 while the bottles 58, 58' move sideways and are held against rotation about their respective vertical axes. The reasons for the formation of fins 59 and 60 are well known to persons skilled in the art of blow molding apparatus. Reference may be had to my aforementioned copending application Ser. No. 344,419 or to my copending application Ser. No. 385,657 filed on July 28, 1964. It suffices to say here that the fins 59, 60 can be broken away by destroying the webs which connect them to the adjoining portions of the bottles without resorting to cutters, i.e., merely by applying against the fins a force which tends to move them with reference to the remainder of the respective bottle or container.

An important feature of the present invention resides in the provision, construction, mounting and operation of the reciprocable gripper 10 and of the conveyor 11, 12 which latter cooperates with the gripper to advance pairs of freshly hardened (self-supporting) bottles 58, 58' toward and past the fin removing devices 13, 14. The conveyor 11, 12 may advance the bottles 58, 58' beyond the fin removing station to deposit such bottles on a collecting or take-off conveyor 90 which is partially shown in the right-hand portion of FIG. 1.

The gripper 10 comprises two jaws 10a, 10b which are mirror symmetrical with reference to a vertical plane X—X shown in FIG. 2. These jaws are pivotable about horizontal pivot axes which are parallel to the direction in which the gripper 10 reciprocates so that the jaws can move toward or away from each other to thereby respectively engage and support or release a pair of bottles 58, 58'. The jaws 10a, 10b are respectively mounted at the upper ends of two inclined supporting arms or carriers 16a, 16b and the lower ends of these arms are pivotably mounted on a reciprocable carriage or slide 17 in such a way that each thereof may be rocked about a horizontal pivot axis which is parallel with the guide rods 18 for the carriage 17. The pivot 22 for the arm 16b is shown in FIG. 3, and the pivot for the arm 16a is parallel with this pivot 22 but is located at the other side of the symmetry plane X—X.

The vertical inner faces 10a', 10b' of the jaws 10a, 10b are provided with pairs of recesses 19a, 19b which receive the neck portions 58a of the bottles 58, 58' when the jaws are moved toward each other and are located directly below the mold 15. Each recess 19a then defines with the corresponding recess 19b an opening which receives at least a part of the respective neck portion 58a. In addition, the jaws 10a, 10b respectively carry pairs of small platforms 20a, 20b which are provided with relatively shallow cutouts 21a, 21b adapted to receive the shoulder portions 58c extending between the neck portions 58a and the main body portions of the bottles 58, 58'. In other words, when the jaws 10a, 10b are moved toward each other, the neck portions 58a will be received in the respective pairs of recesses 19a, 19b and the shoulder portions 58c will extend into the respective pairs of cutouts 21a, 21b. The downwardly extending fins 60 may but need not extend to a level below the vertical inner faces 10a', 10b' of the jaws. The platforms 20a, 20b insure that the neck portions 58a of both bottles 58, 58' are located at the same level and that the bottles remain in upright position while moving toward the conveyor 11, 12.

The gripper 10 may be opened or closed (i.e., the jaws 10a, 10b can be moved away from or toward each other) by a rocking or turning assembly comprising a plate-like cam 25 which is mounted on a downwardly extending portion or extension 26 of the arm 16a and is formed with two cam faces 23, 24. The extension 26 constitutes the lower arm of a two-armed lever whose upper arm is constituted by the carrier 16a, and this two-armed lever is turnable about the horizontal pivot axis of the corresponding pivot 22.

The cam faces 23, 24 respectively cooperate with two spring-biased trips or levers 28, 27 shown in FIG. 3. The trips 27, 28 are located at the opposite ends of the horizontal guide rods 18 for the carriage 17 and are respectively rockable about vertical pins 27a, 28a, i.e., each of these trips can be rocked in a horizontal plane under or against the bias of a helical spring 29 or 30. The springs 29, 30 tend to bias the trips 27, 28 in directions toward the path of the cam faces 24, 23. It will be noted that the trips 27, 28 are provided with friction reducing rollers 27b, 28b which come in direct engagement with the cam faces 24, 23. When the carriage 17 approaches or reaches the right-hand end of its stroke, the roller 27b of the trip 27 engages the cam face 24 and causes the cam 25 to move upwardly, as viewed in FIG. 3 (see the arrow 32) whereby the jaw 10a moves away from the jaw 10b so that the gripper 10 is in open or article-releasing position. Such opening of the gripper 10 will take place when the bottles 58, 58' are properly engaged by the belts of the conveyor 11, 12. The arrow 31 shown in FIG. 3 indicates the direction in which the jaw 10a moves away from the jaw 10b when the cam face 24 is engaged by the roller 27b of the trip 27. The pivots 22 for the arms 16a, 16b carry meshing gears 33, 34 (see particularly FIG. 2) which automatically move the jaw 10b away from the jaw 10a when the arm 16a for the jaw 10a is rocked by the roller 27b of the trip 27. Thus, the arms 16a, 16b are coupled or operatively connected to each other in such a way that the jaw 10b automatically moves in the direction indicated by the arrow 32 when the jaw 10a moves in the direction indicated by an arrow 31, or vice versa.

When the carriage 17 reaches the left-hand end of its stroke, the cam face 23 is engaged by the roller 28b of the trip 28 and causes the cam 25 to rock in the direction indicated by the arrow 31 shown in FIG. 3 whereby the jaw 10a and the arm 16a are compelled to move in the opposite direction (arrow 32) so that the gripper 10 assumes a closed or article-receiving position of its jaws 10a, 10b to automatically grasp a pair of freshly shaped bottles 48, 58'. This will be readily understood since the aforementioned gears 33, 34 insure that the jaw 10b will be rocked in a direction toward the symmetry plane X—X when the jaw 10a is caused to move toward such plane. In other words, and due to the fact that the gears 33, 34 are in constant mesh, it suffices to provide means for rocking one of the jaws 10a, 10b because the other jaw is rocked automatically (but in the opposite direction) as soon as the jaw 10a turns about the horizontal axis of its pivot 22.

The apparatus of my invention further comprises locking means for temporarily fixing or blocking the gripper 10 in the open or closed position. Such locking means comprises a pair of pawls 35, 36 which are mounted on the cam 25 or on the extension 26 and are respectively pivotable about the axes of vertical pins 35a, 36a. These pawls are biased by helical springs 37, 38 so that they tend to rotate in a counterclockwise direction, as viewed in FIG. 3, so that their noses or pallets 35b, 36b respectively engage stops 39, 40. The stops 39 and 40 are fixedly mounted on the carriage 17 so that they cannot rock with the cam 25 but will travel back and forth in response to reciprocation of the carriage 17. The carriage is reciprocated by a double-acting hydraulic or pneumatic cylinder 44 which is stationary but whose piston rod is coupled to the carriage.

The pallets 35b, 36b may be disengaged from the stops 39, 40 by a pair of adjustable releasing members 41, 42 which are mounted on the frame F of the apparatus and are respectively adjacent to the opposite ends of the guide rods 18. As shown in FIG. 3, each of these releasing members 41, 42 may resemble a screw whose tip extends into the pathway of the respective pallet so that the pallet 35b will be disengaged from the stop 39 by striking against the tip of the screw 41 when the carriage 17 reaches or approaches the left-hand end of its stroke and the pallet 36b will be disengaged from the stop 40 by striking against the tip of the screw 42 when the carriage 17 approaches or reaches the right-hand end of its stroke, i.e., when the carriage is moved in the direction indicated by an arrow 43 and at least slightly beyond the position shown in FIG. 3 in which the pallet 36b still engages the stop 40 but is about to strike against the tip of the screw 42. The axial position of the screws 41, 42 may be adjusted with utmost accuracy to thereby select the exact moment when the pallets 35b, 36b are disengaged from the respective stops. It will be noted that the pallet 35b is disengaged from the stop 39 when the carriage 17 moves in a direction to the right (arrow 43) but that the pallet 36b then engages the stop 40. Inversely, when the carriage 17 advances in a direction to the left, the pallet 35b will engage the stop 39 but the pallet 36b will be disengaged from the stop 40.

The pallet 36b must be disengaged from the stop 40 not later than at the time when the carriage 17 reaches the right-hand end of its stroke (arrow 43) because, otherwise, the roller 27b of the trip 27 could not rock the cam 25 and arm 26 in a sense to open the gripper 10, i.e., to move the jaws 10a, 10b away from each other. However, as soon as the cam 25 pivots in response to engagement of the cam face 24 by the roller 27b of the trip 27, the spring 37 immediately compels the pallet 35b of the pawl 35 to engage the stop 39 so that the gripper 10 is automatically locked or blocked in open or article-releasing position and remains in such open position until the pallet 35b strikes against the tip of the screw 41 and is disengaged from the stop 39. At the same time, the roller 28b of the trip 28 engages the cam face 23 and rocks the cam 25 in a sense to move the jaws 10a, 10b toward each other and to thus close the gripper 10 whereby the shoulder portion 58c of the freshly shaped bottles 58, 58' come to rest on the platforms 20a, 20b and the bottles are ready to be entrained in a direction to the right so as to be supported and advanced by the belts of the conveyor 11, 12. Of course, when the roller 28b of the trip 28 engages the cam face 23, the cam 25 is rocked in a sense (arrow 31) to allow the pallet 36b of the pawl 35 to engage the stop 40 under the bias of the spring 38 so that the gripper 10 remains in closed position until the pallet 36b strikes against the tip of the screw 42. It will be seen that the gripper 10 is automatically locked in open position when the carriage 17 travels in a direction toward the molding station MS and that the gripper 10 is automatically locked in closed position when the carriage 17 travels in a direction away from the molding station.

The springs 29 and 30 insure that the trips 27, 28 can yield to the pressure exerted by the cam 25 until the pallets 36b, 35b are respectively disengaged from the stops 40, 39. Thus, the gripper 10 invariably remains in a fully open or in a fully closed position, and the movement between such positions takes place almost instantaneously as soon as the jaws 10a, 10b can be rocked by the springs 29, 30 through the intermediary of the trips 27, 28.

The conveyor 11, 12 is located at a level above the jaws 10a, 10b of the gripper 10. This conveyor comprises an upper pair of coplanar endless flexible belts 11a, 11b and a lower pair of coplanar endless flexible belts 12a, 12b. The planes of the belts 11a, 11b and 12a, 12b are horizontal and it will be noted that the belts 11a, 12a and 11b, 12b are respectively located at the opposite sides of the symmetry plane X—X. The belt 11a is trained around pulleys 45, 46, 51, 52 and the belt 11b is trained around pulleys 47, 48, 53, 54 best shown in FIG. 2. The belt 12b is trained around four pulleys including the pulleys 49, 50 shown in FIG. 1, and the belt 12a is also trained around four pulleys (not shown) which are coaxial with but are located at a level below the pulleys 45, 46, 51, 52 for the belt 11a. FIG. 2 shows that the inner stringers 55a of the belts 11a, 12a are located in a vertical plane which is parallel with but spaced from the common vertical plane of the inner stringers 55b of the belts 11b, 12b. The channel or passage between the inner stringers 55a, 55b is as wide as or somewhat narrower than the corresponding dimensions of the bottles 58, 58' so that, once they enter this passage, the bottles are engaged and supported by the stringers 55a, 55b and are compelled to advance in a direction toward and past the fin removing devices 13, 14. FIG. 1 shows that the upper edge portions 56 of the upper belts 11a, 11b are located in a plane which is at least slightly below the fins 59 of the bottles 58, 58' and that the lower edge portions 57 of the lower belts 12a, 12b are located in a plane which is at least slightly above the fins 60, i.e., above the lower ends of the neck portions 58a of the bottles 58, 58'. This insures that the belts 11a, 11b, 12a, 12b cannot interfere with the operation of the devices 13, 14 when the bottles 58, 58' advance past the fin removing station. Furthermore, such mounting of the belts insures that the jaws 10a, 10b can travel at a level below the lower edge portions 57 without interfering with the movement of the lower belts 12a, 12b. FIG. 1 shows that the platforms 20a, 20b of the jaws 10a, 10b are located somewhat below the lower belts 12a, 12b, and these jaws reciprocate in a horizontal plane which is parallel with the plane of the lower edge portions 57. It is clear that the belts 11a, 11b and 12a, 12b may be replaced by chains or by other suitable endless flexible elements as long as such flexible elements can support and advance the bottles 58, 58' in the passage between the inner stringers 55a, 55b. If the belts are replaced by chains, the pulleys 45–54 and the remaining non-illustrated pulleys are replaced by sprocket wheels.

The fin removing devices 13, 14 are respectively driven by electric motors 61, 62 shown in FIG. 1, and each of these devices comprises one or more revolving blades 13a, 14a which rotate about vertical axes and are respectively located in the path of the fins 59, 60. The rotational speed of the shafts 13b, 14b of the fin removing devices 13, 14 is selected in such a way that each fin is invariably engaged and broken off the respective end portion of the bottle 58 or 58' before the bottle moves beyond the range of the devices 13, 14. If desired, the devices 13, 14 may be staggered with reference to each other in the longitudinal direction of the passage between the inner stringers 55a, 55b, and it is also possible to mount such devices laterally of the passage between the stringers 55a, 55b. FIG. 1 shows that the blades 13a, 14a respectively revolve in planes which are located at least slightly above the upper edge portions 56 and below the lower edge portions 57 so that such blades cannot damage or destroy the belts 11a, 11b, 12a, 12b despite the fact that the belts preferably extend beyond the fin removing station so that their inner stringers 55a, 55b can deliver the bottles 58, 58' (with the fins 59, 60 removed) onto the upper run of the collecting or take-off conveyor belt 90. The left-hand end turn of this belt 90 is broken away but it will be understood that the belt 90 extends to a level below the pulleys 52, 54 to make sure that it can properly support the bottles as soon as such bottles are released by the inner stringers 55a, 55b. It is also clear that the belt 90 may be replaced by another take-off conveyor or by a gripper similar or analogous to the gripper 10.

The belts 11a, 11b, 12a, 12b are driven intermittently in such a way that the inner stringers 55a, 55b can travel in a direction from the molding station MS toward the fin removing devices 13, 14 but cannot travel in the opposite direction. The means for intermittently driving the belts 11a–12b in such direction (arrow 43) comprises a chain 63 whose ends are fixedly secured to the carriage 17 (or to the piston rod of the cylinder 44) and which is trained around two sprocket wheels 64, 65. The sprocket wheels 64, 65 are rotatable about horizontal axes and are respectively mounted adjacent to the opposite ends of the guide rods 18, see FIG. 1. The sprocket wheel 65 is mounted on and can drive a transversely extending horizontal shaft 66 (see particularly FIG. 3) which carries two bevel gears 67, 68. The gears 67, 68 respectively mesh with bevel gears 69, 70 which drive two cardanic shafts 71, 71a. The shaft 71 drives the pulleys 47, 49 of the belts 11b, 12b. The shaft 71ª drives the pulley 45 of the belt 11a and that pulley of the belt 12a which is coaxial with the pulley 45. The connection between the sprocket wheel 65 for the chain 63 and the shaft 66 comprises a one-way clutch 66a, shown in FIG. 3, which will drive the shaft 66 when the sprocket wheel 65 rotates in one direction (so as to advance the inner stringers 55a, 55b in a direction toward the fin removing devices 13, 14) but allows the sprocket wheel 65 to rotate with reference to the shaft 66 when the carriage 17 moves from the position shown in FIG. 1 toward the sprocket wheel 65. The directions in which the pulleys 45, 47 are driven when the gripper 10 travels toward the fin removing devices 13, 14 are indicated in FIG. 2 by arrows 72, 73, i.e., the pulleys 45, 47 then respectively rotate in a counterclockwise and in a clockwise direction to move the inner stringers 55a, 55b in the direction indicated by the arrow 43. The speed of the inner stringers 55a, 55b is identical with the speed of the carriage 17 so that there is no relative movement between the belts and the gripper excepting, of course, that the jaws 10a, 10b can move away from each other as soon as two freshly transferred bottles 58, 58' are properly engaged and supported by the inner stringers 55a, 55b.

One of the shafts 71, 71a may be omitted if the pulleys for the belts 11a–12b are connected by a gear train or another suitable motion transmitting assembly which will rotate all of the remaining pulleys or certain pulleys in response to rotation of a single pulley.

The arm 16b of the jaw 10b carries a rectangular frame-like holder 75 which is mounted at the upper side of the arm 16b and extends laterally so as to overlie the arm 16a, see FIG. 2. The end walls 76, 77 of the holder 75 carry axially adjustable arresting screws 78, 79 whose tips 80, 81 are located in the space between the end walls 76, 77 and are disposed at the opposite sides of a projection 82 which is rigid with the arm 16a. When the gripper 10 is open, i.e., when its jaws 10a, 10b are caused to move away from each other, the tip 80 of the arresting screw 78 abuts against the projection 82 and thus determines the extent to which the jaws 10a, 10b can move away from each other. When the jaws 10a, 10b are caused to move toward each other, the projection 82 is engaged by the tip 81 of the arresting screw 79 to determine the exact position of the jaws when the gripper 10 is closed. By properly adjusting the axial position of the arresting screws 78, 79, the operator can determine the extent of pivotal movement of the jaws 10a, 10b toward and away from each other.

The molding station MS accommodates the aforementioned open-and-shut mold 15 which comprises two sections or halves 15c, 15d, and these mold sections are respectively formed with two mold cavities 15a, 15b, see FIG. 6. The sections 15c, 15d are movable toward and away from each other in a manner well known from the art and, when moved together, their vertical inner faces abut in a plane which coincides with the symmetry plane X—X. FIG. 6 shows the sections 15c, 15d at a maximum distance from each other whereby the gap between the cavities 15a, 15b is wide enough to allow for descent of the bottles 58, 58' to a level shown in FIG. 5 in which the neck portions 58a and shoulder portions 58c of such bottles are engaged by the jaws 10a, 10b. Each mold section 15c, 15d may constitute a unitary structure or it may comprise two or more sections which are movable independently of each other.

The molding station MS further accommodates two vertically reciprocable blowing mandrels 85, 86 which serve to admit a compressed gas into the parisons which are discharged into the composite mold cavities formed by cooperating cavities 15a, 15b from the nozzles of an extruder, not shown, so that such parisons expand and follow the outlines of the respective composite mold cavities. In addition, the mandrels 85, 86 serve to shape the neck portions 58a of the bottles 58, 58' and to lower the bottles when the mold 15 opens and its sections 15c, 15d take the positions shown in FIG. 6. In other words, the blowing mandrels 85, 86 will admit compressed gas into the parisons, they will also cooperate with the lower portions of the mold sections 15c, 15d to shape the neck portions 58a, and these mandrels also serve as a means for transferring the bottles 58, 58' from the space between the mold sections 15c, 15d into such position in which the bottles are ready to be grasped by the jaws 10a, 10b of the gripper 10. The manner in which the mandrels 85, 86 reciprocate in and counter to the direction indicated by an arrow 87 (see FIG. 4) and in which the mold sections 15c, 15d move toward and away from each other is well known from the art of blow molding apparatus and need not be described here. Such reciprocatory movements may be effected by resorting to hydraulic or pneumatic cylinders, to electromagnets or to mechanical reciprocating devices.

The apparatus of my invention is operated as follows:

The cylinder 44 causes the carriage 17 to perform a stroke in a direction to the left, as viewed in FIGS. 1 to 3, so that the gripper 10 moves to the receiving end position below the mold 15. The gripper 10 is locked in open position because the pallet 35b of the pawl 35 engages the stop 39. Once it reaches the end of its left-hand stroke, the gripper 10 is opened in a fully automatic way because the tip of the screw 41 strikes against the pallet 35b and disengages the pawl 35 from the stop 39. At the same time, the spring 38 compels the pallet 36b of the pawl 36 to engage the stop 40 so that the gripper 10 is locked in closed position. During movement of the jaws 10a, 10b toward each other (under the bias of the spring 30 and as soon as the pallet 35b is disengaged from the stop 39), the gripper 10 is held in such position that the neck portions 58a of the bottles 58, 58' extend into the space between the corresponding pairs of recesses 19a, 19b and that the shoulder portions 58c of such botles extend into the space between cutouts 21a, 21b of the platforms 20a, 20b.

The sections 15c, 15d of the mold 15 move apart before the gripper 10 moves to closed position and remain spaced apart while the mandrels 85, 86 move the upper end positions shown in FIG. 4 to the positions shown in FIG. 5 (arrow 87) whereby the mandrels lower the bottles 58, 58' and are disengaged from the neck portions 58a as soon as the shoulder portions 58c come to rest on the platforms 20a, 20b. Thus, the jaws 10a, 10b also perform the function of strippers by holding the bottles 58, 58' against further movement with the mandrels 85, 86. During movement of the mandrels 85, 86 from the positions shown in FIG. 4 to the positions of FIG. 5, the mold sections 15c, 15d are held in the positions shown in FIG. 6, i.e., they are disengaged from the bottles 58, 58.' The openings formed by the recesses 19a, 19b when the gripper 10 is in closed position are large enough to accommodate the neck portions 58a but are too small to allow for passage of the shoulder portions 58c so that the bottles 58, 58' are automatically arrested in the positions shown in FIG. 5 and are then ready to move toward the conveyor 11, 12 as soon as the cylinder 44 compels the carriage 17 to perform a stroke in the direction indicated by the arrow 43. The operation of the cylinder 44 is synchronized with the operation of the assembly which reciprocates the mandrel 65, 66 so that the carriage 17 begins to move in a direction to the right only at the time when the mandrels are withdrawn to a level below the jaws 10a, 10b and below the fins 60.

When the carriage 17 reaches the right-hand end of its stroke, i.e., when it moves slightly beyond the position shown in FIGS. 1 to 3, the gripper 10 is opened because the face 24 of the cam 25 engages the roller 27b of the trip 27 and because the pallet 36b of the pawl 36 strikes against the tip of the screw 42. However, the bottles 58, 58' are already located in the passage between the inner stringers 55a, 55b of the belts 11a–12b so that the belts automatically retain and support the bottles in optimum position for movement past the fin removing station. Such movement of the bottles 58, 58' will take place when the carriage 17 performs the next stroke in a direction away from the molding station MS because the chain 63 then rotates the sprocket wheel 65 in a sense to drive the pulleys 45, 47 in the directions indicated by the arrows 72, 73. Two bottles 158, 158' are shown by phantom lines at the fin removing station of FIG. 1. When the belts 11a–12b again advance in a direction to the right, as viewed in FIG. 1, the bottles 158, 158' are transferred onto the belt 90 and the bottles 58, 58' enter the fin removing station.

It is clear that the mold 15 may be mounted in such a way that the neck portions 58a are located at the upper ends of the bottles. In such apparatus, the gripper 10 will be mounted at a level above the conveyor 11, 12. This would amount to a mere reversal in the positions of the gripper 10 and conveyor 11, 12.

Finally it should be noted that the neck portions 58a of the bottles 58, 58' might have additional fins 60a (shown in FIGS. 4 and 5) which extend radially of the neck portions and are formed by plastic material which leaks into the space between the adjoining vertical faces of the mold sections 15c, 15d when the mold 15 is closed. Such fins 60a are broken away in response to removal of the fins 60 or they may be removed by additional fin removing devices, not shown. The space beneath the fin removing devices 13, 14 may accommodate a receptacle which collects the fins 59, 60 and 60a and which may be provided with an outlet to allow for continuous or intermittent evacuation of accumulated fins.

It is further within the scope of my invention to transport the articles in such a way that the articles are supported from below or from above and below and to transport the articles in horizontal position, i.e., with the neck portions 58a located ahead of or past the bottom portions 58b. Alternately, the articles can be transported sideways with their axes located in a horizontal plane. In such apparatus the stringers 55a, 55b will be located in vertically spaced horizontal planes and the fin removing devices will be mounted laterally of the conveyor.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. In an apparatus for the production and processing of plastic bottles and other hollow plastic articles of the type having outwardly extending fins or similar projections, means including a mold for shaping at least one article at a time; fin removing means spaced from said mold; conveyor means for advancing the articles past said fin removing means in such a position that the projections are automatically separated during travel past said fin removing means; and means for transferring articles from the region of said mold to said conveyor means.

2. In an apparatus for the production and processing of plastic bottles and other hollow plastic articles of the type having readily separable outwardly extending fins or similar projections, means including an open-and-shut mold for shaping at least one article at a time; fin removing means spaced from said mold; conveyor means for advancing the articles seriatim past said fin removing means and for supporting the articles in such position that the projections are automatically separated during travel past said fin removing means; and reciprocable gripper means for transferring articles from the region of said mold to said conveyor means.

3. In a blow molding apparatus for the production and processing of plastic bottles and other hollow plastic articles of the type having outwardly extending readily separable fins or similar projections, means including an open-and-shut mold for shaping at least one hollow article at a time; at least one fin removing device spaced from said mold; conveyor means comprising at least one pair of belts having stringers cooperating to advance the articles past said fin removing device and to support the articles in such position that said device automatically separates the projections from consecutive articles; and gripper means reciprocable between the region of said mold and said conveyor means for transferring the articles seriatim into the range of said stringers.

4. In an apparatus for the production and processing of plastic bottles and other hollow plastic articles of the type having outwardly extending readily separable fins or similar projections, means including an open-and-shut mold for shaping at least one hollow article at a time, said mold comprising a pair of mold sections movable toward and away from each other and said mold sections abutting against each other in a vertical plane when the mold is shut; at least one fin removing device spaced from said mold; conveyor means comprising at least one pair of belts having stringers cooperating to advance the articles past said fin removing device and to support the articles in such position that said device automatically separates the projections from consecutive articles; and gripper means reciprocable in a horiozntal plane between the region of said mold and said conveyor means for transferring the articles seriatim into the range of said stringers.

5. A structure as set forth in claim 4, wherein said horizontal plane is located at a level below said mold.

6. A structure as set forth in claim 4, wherein said pairs of belts are disposed in vertically spaced horizontal planes and wherein said gripper means transfers the articles in such position that a fin-carrying portion of each article located between said stringers extends in vertical direction beyond said belts.

7. In an apparatus as set forth in claim 2 wherein said fin removing comprises at least one rotary blade.

8. In a blow molding apparatus for the production and processing of plastic bottles and other hollow plastic articles of the type having readily separable outwardly extending fins or similar projections, an open-and-shut mold comprising a pair of sections movable toward and away from each other and together defining at least one article-shaping cavity when moved toward each other to meet in a vertical plane; a blowing mandrel reciprocable from below into said cavity and away from said mold to respectively admit a compressed gas into said cavity when the mold is shut and to withdraw a freshly shaped article when the mold opens; fin removing means spaced from said mold; conveyor means for advancing the articles seriatim past said fin removing means and for supporting the articles in such position that the projections are automatically separated while advancing past said film removing means; and gripper means reciprocable in a horizontal plane for transferring articles from said blowing mandrel to said conveyor means, said gripper means comprising a pair of jaws movable away from each other to receive articles from said blowing mandrel and to release articles upon transfer to said conveyor means, said jaws being also movable toward each other to grasp and to thereby strip the articles off said mandrel while the mandrel continues to move away from said mold and to grasp the articles during transfer to said conveyor means.

9. A structure as set forth in claim 8, wherein said jaws are provided with registering recesses which accommodate portions of articles when the jaws move toward each other to grasp the articles during movement of said blowing mandrel away from said mold.

10. In an apparatus for the production and processing of plastic bottles and other hollow plastic articles of the type having readily separable outwardly extending fins or similar projections, means including an open-and-shut mold for shaping at least one article at a time; fin removing means spaced from said mold; conveyor means for advancing the articles seriatim past said fin removing means and for supporting the articles in such position that the projections are automatically separated from consecutive articles during travel past said fin removing means; reciprocable gripper means for transferring articles from the region of said mold to said conveyor means; a carriage supportingly connected with said gripper means; and means for reciprocating said carriage through strokes of such length that the gripper means moves between an article-receiving end position and an article-releasing end position.

11. A structure as set forth in claim 10, wherein said gripper means comprises a pair of jaws movable toward and away from each other to respectively grasp and release the articles and wherein each of said jaws is supported by said carriage for pivotal movement about a pivot axis which is parallel with the direction of reciprocation of said gripper means.

12. A structure as set forth in claim 11, wherein said gripper means further comprises a pair of arms each connected with one of said jaws and pivotably secured to said carriage.

13. A structure as set forth in claim 11, further comprising rocking means for pivoting said jaws toward and away from each other in response to movement of said gripper means to said article-receiving and article-releasing end positions.

14. A structure as set forth in claim 13, wherein said rocking means comprises cam means rigid with one of said jaws, and a pair of trips positioned in the pathway of said cam means to engage and to pivot said cam means in opposite directions about the respective pivot axis when the carriage approaches the respective ends of its strokes.

15. A structure as set forth in claim 14, wherein each of said trips comprises a spring-biased lever and wherein said cam means comprises two cam faces each of which is engaged by one of said levers in the corresponding end position of said gripper means.

16. A structure as set forth in claim 11, further comprising rocking means for respectively pivoting one of said jaws toward and away from the other jaw in response to movement of said gripper means to said article-receiving and article-releasing end positions, and means for respectively pivoting the other of said jaws toward and away from said one jaw in response to corresponding pivotal movement of said one jaw.

17. A structure as set forth in claim 16, wherein the means for pivoting said other jaw comprises a pair of meshing gears each fixed to and each rotatable about the pivot axis of one of said jaws.

18. In an apparatus for the production and processing of plastic bottles and other hollow plastic articles of the type having outwardly extending readily separable fins or similar projections, means including an open-and-shut mold for shaping at least one article at a time; fin removing means spaced from said mold; conveyor means for advancing the articles past said fin removing means and for supporting the articles in such position that the projections are automatically separated during travel past said fin removing means; gripper means reciprocable in a horizontal plane and arranged to transfer articles from the region of said mold to said conveyor means, said gripper means comprising a pair of jaws movable toward and away from each other to respectively grip or release the articles, an arm connected with each of said jaws and rockable about a pivot axis which is parallel to the direction of reciprocation of said gripper means, and an extension rigid with one of said arms and extending to the opposite side of the respective pivot axis; a reciprocable carriage supportingly connected with said arms; guide means for guiding said carriage; means for reciprocating said carriage between two end positions in one of which said jaws are adjacent to and receive articles in the region of said mold and in the other of which said jaws are adjacent to said conveyor means; and rocking means for moving said jaws toward and away from each other, comprising a cam secured to said extension, a pair of fixed trips located in the pathway of said cam and arranged to pivot said cam about the respective pivot axis in such directions that said one jaw moves toward the other jaw in said one end position and that said one jaw moves away from the other jaw in said other end position of said carriage, and means for pivoting said other jaw toward and away from said one jaw in response to corresponding pivotal movement of said one jaw.

19. A structure as set forth in claim 18, further comprising means for locking said jaws against pivotal movement with reference to each other while the carriage moves between said end positions.

20. A structure as set forth in claim 19, wherein said locking means comprises a pair of stops fixed to said carriage, a pair of pawls supported by said extension, means for biasing each of said pawls into engagement with one of said stops, one of said pawls engaging the corresponding stop when said jaws are spaced apart sufficiently to receive articles in the region of said mold and the other of said pawls engaging the corresponding stop when the jaws are sufficiently close to each other to grasp the articles, first releasing means for automatically disengaging said one pawl from the corresponding stop in response to movement of said carriage to said one end position, and second releasing means for automatically disengaging the other pawl from the corresponding stop in response to movement of the carriage to said other end position.

21. A structure as set forth in claim 20, further comprising a fixed frame for said carriage, each of said releasing means being adjustably supported by said frame and extending into the pathway of the corresponding pawl.

22. A structure as set forth in claim 20, wherein said pawls are mounted on said cam means.

23. An apparatus for the production and processing of plastic bottles and other hollow plastic articles of the type having readily separable outwardly extending fins or similar projections, comprising means including an open-and-shut mold for shaping at least one article at a time; fin removing means spaced from said mold; conveyor means for advancing the articles past said fin removing means and for supporting the articles in such position that the projections are automatically separated during travel past said fin removing means, said conveyor means comprising at least one pair of belts having spaced parallel article-supporting stringers defining between themselves an elongated passage in which the articles advance in a direction toward and past said fin removing means; gripper means for transferring articles from the region of said mold to a portion of said passage which is remote from said fin removing means; reciprocating means for moving said gripper means back and forth between two spaced end positions in one of which said gripper means receives articles and in the other of which said gripper means supports the articles in said portion of said passage; and drive means for intermittently advancing said stringers to move the articles from said portion of said passage toward and past said fin removing means in response to movement of said gripper means to said other end position.

24. An apparatus as set forth in claim 23, wherein said reciprocating means comprises a reciprocable carriage supportingly connected with said gripper means and means for reciprocating said carriage, said drive means comprising a chain coupled to a reciprocable portion of seaid reciprocating means, a sprocket driven by said chain, gear means for driving said belts in response to rotation of said sprocket during movement of said gripper means to said other end position, and one-way clutch means interposed between said gear means and said sprocket for permitting rotation of said sprocket with reference to said gear means when said gripper means moves toward said one end position.

25. In an apparatus for the production and processing of plastic bottles and other hollow plastic articles of the type having outwardly extending readily separable fins or similar projections, means including an open-and-shut mold for shaping at least one article at a time; fin removing means spaced from said mold; conveyor means for advancing the articles past said fin removing means and for supporting the articles in such position that the projections are automatically separated during travel past said fin removing means, gripper means reciprocable in a horizontal plane and arranged to transfer articles from the region of said mold to said conveyor means, said gripper means comprising a pair of jaws movable toward and away from each other to respectively grip or release the articles, an arm connected with each of said jaws and rockable about a pivot axis which is parallel to the direction of reciprocation of said gripper means, and an extension rigid with one of said arms and extending to the opposite side of the respective pivot axis; a reciprocable carriage supportingly connected with said arms; guide means for guiding said carriage; means for reciprocating said carriage between two end positions in one of which said jaws are adjacent to and receive articles in the region of said mold and in the other of which said jaws are adjacent to said conveyor means; rocking means for moving said jaws toward and away from each other; and arresting means for limiting the extent of movement of said jaws toward and away from each other.

26. A structure as set forth in claim 25, wherein said arresting means comprises a pair of adjustable arresting members supported by one of said arms and a projection located between said arresting members and fixed to the other arm.

27. A structure as set forth in claim 26, further comprising a holder fixed to said one arm and having a pair of spaced walls, each of said arresting members comprising a screw threaded into one of said walls and adjustable in the axial direction thereof, said projection being located between said walls and between said screws.

References Cited

UNITED STATES PATENTS

| 3,211,815 | 10/1965 | Cordiale et al. | |
| 3,052,916 | 9/1962 | Campbell | 18—5 |
| 3,218,669 | 11/1965 | Barker | 18—5 |
| 3,270,116 | 8/1966 | Ruekberg | 18—5 X |

FOREIGN PATENTS

| 1,170,301 | 9/1958 | France. |

WILBUR L. McBAY, *Primary Examiner.*